March 7, 1967 F. T. FUGE 3,307,600

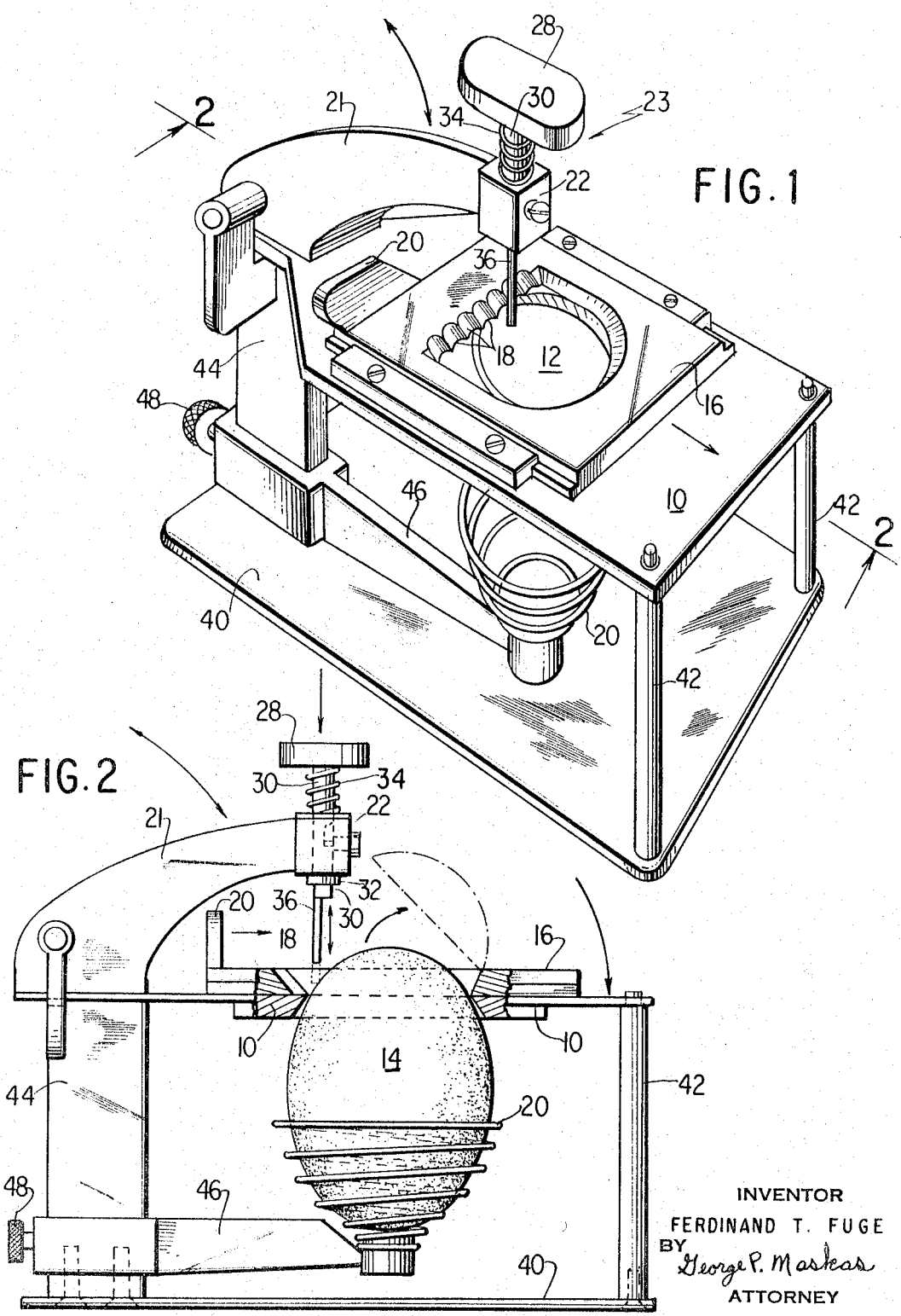

METHOD AND APPARATUS FOR DECAPPING EGGS

Filed Feb. 23, 1965 2 Sheets-Sheet 2

INVENTOR
FERDINAND T. FUGE
BY George P. Markas
ATTORNEY

United States Patent Office 3,307,600
Patented Mar. 7, 1967

3,307,600
METHOD AND APPARATUS FOR DECAPPING EGGS
Ferdinand T. Fuge, Winsted, Conn., assignor to Richardson-Merrell Inc., New York, N.Y., a corporation of Delaware
Filed Feb. 23, 1965, Ser. No. 434,593
6 Claims. (Cl. 146—221)

This invention relates to a novel method and apparatus for decapping eggs and more particularly for decapping raw eggs.

Certain manufacturing and processing industries, for example, the pharmaceutical and baking industries utilize large quantities of eggs. In many instances, these eggs must be decapped and the contents removed from the shell in a raw state. There are a large number of existing egg-decapping methods and devices which, for example break, saw, cut, or burn through the shell. However, these methods and devices suffer from various shortcomings such as the use of expensive apparatus, the contamination of egg contents, and the undue breakage of the shell. This problem is particularly acute in the pharmaceutical industry where large quantities of embryonated eggs are used as the host, for example, in the manufacture of vaccines.

It is an object of this invention to provide a simple, economical and convenient method and apparatus for decapping eggs, and particularly a method and apparatus which does not possess the above described shortcomings.

Briefly, in the method of this invention, an egg is held vertically by resilient means with a minor portion of the top of the egg extending above a bearing surface which encircles the egg. The shell is broken or punctured with a punch or needle adjacent to and above the bearing surface. A knife then passes over the bearing surface penetrating the shell in the area broken by the punch. The knife cuts across the shell of the egg and decaps it. Preferably, the knife edge is serrated.

The novel features and advantages of the present invention will become apparent to one skilled in the art from a reading of the following description in conjunction with the accompanying drawings wherein similar numerals refer to similar parts and in which:

FIG. 1 is a perspective view of one embodiment of the apparatus of this invention;

FIG. 2 is a partially cut-away elevation taken in the plane of the line 2—2 of the apparatus in FIG. 1 including an egg mounted in the apparatus;

Figure 3:
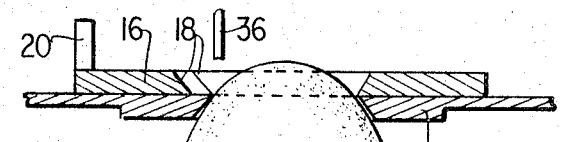
FIG. 3 is a partly cut-away elevation of the apparatus of FIG. 1 illustrating the position of the egg and various parts of the apparatus prior to breaking the shell.

The apparatus illustrated in the drawings and particularly in FIGS. 1 and 2 comprises a plate 10 having a circular opening 12 therein. The opening is of such diameter as to encompass a minor circumference of an upstanding egg 14. The bearing portions or sides of the opening 12 contact the base periphery of a minor chordal segment of the egg parallel to its minor axis. Slidably mounted on plate 10 is a knife 16 having a serrated cutting edge 18. The knife 16 has a raised flange 20 at one end. The blade shown in the drawing has a plurality of points on the serrated edge which are spaced apart at a distance substantially less than the diameter of the plate opening 12. The blade is held in sliding contact with plate 10 by side bars 17.

Below plate 10 is a resilient, helical cup-shaped spring 20. Helical spring 20 is adapted to hold an egg in a vertical position, i.e. the major axis of the egg is substantially normal to the plane across opening 12. Spring 20 resiliently urge the egg upwardly against the bearing surface of plate opening 12. Preferably the bearing surface makes a circular line contact with the egg and the knife 16 slides on the plate immediately above or adjacent to the circular periphery of line contact.

Mounted above plate 10 is a member 21 which slidably supports punch needle assembly 23. The punch assembly 23 comprises a rigid member 22, a punch handle or top 28, a sleeve 30, a flanged member 32 at a lower end of the sleeve 30, a coil spring 34 and a punch or needle 36. The punch 36 is aligned adjacent an edge and within the opening 12 on the side through which the blade 16 passes through the egg. The punch handle 28 is attached to fitment 30 which carries the punch 36. The punch is maintained in the position down in FIGS. 1 and 2 by action of the helical spring 34 pressing upwardly against handle 28. Helical spring also abuts at its lower end on the top of member 22. Fitment 30 is axially slidable within member 22. The enlarged ring 32 is rigidly fixed to member 30 and limits its upward movement by abutting against the bottom of member 22.

The apparatus also comprises a base 40 which supports plate 10 by uprights 42, 42 and 44. Slidably mounted on upright 44 is a member 46 to which the helical spring 20 is attached. The egg is supported within the spring 20 in spaced relation above the point of attachment of the spring to the member 46. Thus, the egg when in the position shown in FIG. 2 can be pushed downwardly a short distance by the punch without abutting against the member 46. A set screw 48 fixes the vertical position of the member 46 on upright 44 which in turn determines the distance between the cup spring 20 and the plate opening 12. Upright 44 also rigidly holds the member 21 in place over the opening 12 and knife 16.

In operation of the above device, set screw 48 is loosened and member 46 is lowered. Egg 14 is placed within coil spring 20, preferably with the pointed most end of the egg facing downwardly, thus the end of the egg having the air sac is pointed upwardly. Member 46 is then raised and a minor circumference of the egg parallel to the egg's minor axis is resiliently pressed against the circumference or bearing portion of the plate opening 12. Set screw 48 is then tightened to hold the arm 46 in place. Punch handle 28 is then given a sharp rapid downward blow whereby punch 36 breaks the shell of the egg above and adjacent the side of the plate opening 12 and the knife edge 18. The downward force of the punch causes the egg to move downwardly against the spring 20. After receiving the blow from punch 36, the egg is again yieldingly pressed in contact with plate opening 12 by the resilient force of the spring 20. The break in the shell of the egg by the punch is within a relatively small area of the egg's surface. After breaking the shell the punch is retracted, the knife 16 is then moved rapidly across the plate opening and immediately above the egg circumference in contact with the bearing surface. The knife 16 and preferably a tooth of the serrated knife edge 18 first enters into the egg through the broken shell area.

The break in the egg shell facilitates the knife's penetration into and through the egg. Failure to so break the egg prior to cutting contact with the knife causes breakage of the shell at a side of the egg opposite the side from which the knife enters. The resilient supporting means for the egg cushions the downward force of the punch which would otherwise cause a certain incidence of breakage of the egg at its bottom portion.

Figure 4:
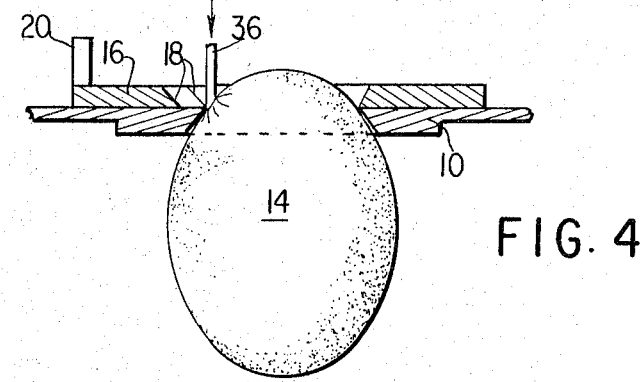
FIG. 4 illustrates the breaking of the shell by the punch in the apparatus of FIG. 3.
Figure 5:
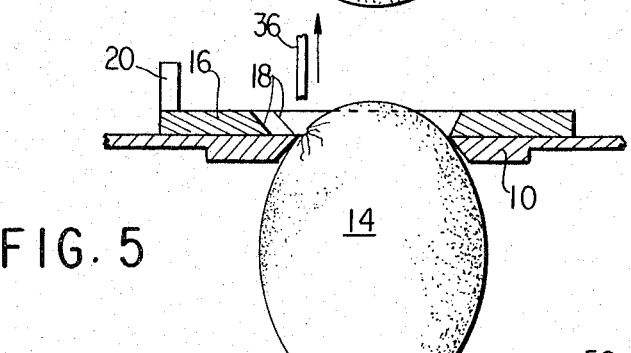
FIG. 5 shows the withdrawal of the punch after breaking the egg with the apparatus of FIG. 3.
Figure 6:
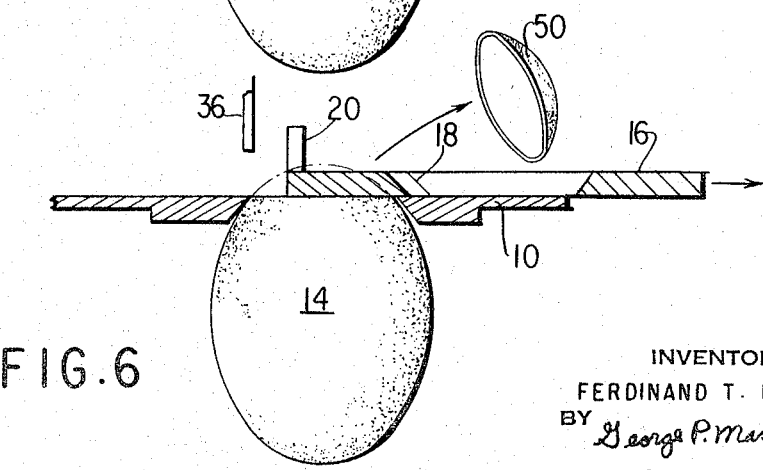
FIG. 6 shows the knife blade of FIG. 3 in an advanced position after decapping the egg.

Referring now to FIGS. 3–6 there are shown various steps of the egg decapping process. In each instance the egg is pressed against the edges of opening 12. This is done with resiliently yieldable support means, such as the spring cup of FIGS. 1 and 2, which is not shown in these figures. In FIG. 3, the punch is in the raised position. In FIG. 4 the punch is shown in the advanced position after breaking the egg shell. In FIG. 5 the punch is again in the raised or retracted position after having broken the egg shell. In FIG. 6 the knife is shown in its advanced position after decapitating the egg. The severed egg cap 50 can be directed into a container or disposed by a jet of air, not shown in the drawings.

What is claimed:

1. Egg decapping apparatus comprising:
   (a) a substantially closed ring which is slightly smaller than the girth of an average egg;
   (b) means for holding said ring in a fixed position in which the entire circumference of said ring is free to contact the shell of an egg through which a portion of the egg may extend;
   (c) a blade member slidably supported upon said ring on one side of the ring opening;
   (d) means for moving said blade member toward the ring opening and thereacross to sever the top of an egg projecting therethrough;
   (e) a punch disposed above the ring opening on the same side thereof as the blade;
   (f) a resilient support for an egg disposed below said ring opening;
   (g) means to raise said support to resiliently press an egg within the ring;
   (h) means to advance said punch toward the ring opening and then to retract the punch therefrom.

2. Decapping apparatus of claim 2 wherein the blade member has a serrated cutting edge.

3. An egg decapping apparatus comprising:
   (a) bearing means defining a circular opening through which an end of an egg may extend, said opening adapted for fitting about a minor circumference of an egg substantially transverse to its major axis;
   (b) a resilient egg support means on one side of said bearing opening from which the major portion of the egg extends, said support operatively aligned substantially in the vertical plane of the center of said opening; said support means adapted for urging an egg partly through said bearing opening;
   (c) a punch disposed on the opposite side of said bearing opening, means for advancing the punch longitudinally toward the bearing opening adjacent a point about a bearing opening side and substantially transverse to the plane across said bearing opening; and
   (d) a knife having a serrated cutting edge slidable on said bearing means across the circumference of the bearing means opening from the side adjacent the punch.

4. Egg decapping apparatus comprising:
   (a) a horizontal plate having a circular opening therein for fitting about a minor circumference of an egg;
   (b) a resilient cup shaped egg support below said bearing opening and operatively aligned therewith to press an upstanding egg against the sides of said plate opening;
   (c) an elongated punch disposed over said plate opening, means for vertically advancing the punch adjacent a point about a side of the plate opening;
   (d) a knife having a serrated cutting edge slidable on top of said plate and across the plate opening from the punch side across to the opposite side of the opening.

5. A method for decapping an egg which comprises:
   (a) yieldingly pressing an egg against a circular bearing surface encircling the base periphery of a minor chordal segment parallel to the minor axis of said egg;
   (b) punching and breaking the shell of the egg adjacent the perimeter of said chordal segment by applying force substantially parallel to said major axis to produce a localized break in the egg's shell;
   (c) decapping said egg by passing a serrated knife blade across the base of said chordal segment, said blade entering the egg in the localized broken area and passing substantially normal to said major axis.

6. A method for decapping an egg which comprises:
   (a) yieldingly holding the base periphery of an upper minor chordal segment of an egg against a circular bearing surface;
   (b) breaking the shell of the egg adjacent and above the perimeter of said egg chordal segment by applying a sharp blow substantially parallel to the egg's major axis; and
   (c) decapping said egg by passing a knife through the broken area and thereafter completely across said shell parallel to the egg's minor axis.

References Cited by the Examiner

UNITED STATES PATENTS

| | | | |
|---|---|---|---|
| 1,372,564 | 3/1921 | Simkiss | 146—2 |
| 1,727,260 | 9/1929 | Uhlig | 146—2 |
| 2,811,188 | 10/1957 | Pavelko | 146—2 |
| 2,904,089 | 9/1959 | Formis | 146—2 |

WILLIAM W. DYER, JR., *Primary Examiner.*

W. GRAYDON ABERCROMBIE, *Examiner.*